United States Patent Office 3,641,162
Patented Feb. 8, 1972

3,641,162
PRODUCTION OF ETHERS
Duncan Clark and Percy Hayden, Norton-on-Tees, England, assignors to Imperial Chemical Industries Limited, London, England
No Drawing. Continuation-in-part of application Ser. No. 402,937, Oct. 9, 1964. This application Apr. 3, 1969, Ser. No. 813,295
Claims priority, application Great Britain, Oct. 14, 1963, 40,420/63
Int. Cl. C07c 41/06, 41/10
U.S. Cl. 260—614 AA                    8 Claims

ABSTRACT OF THE DISCLOSURE

A process for the production of alkyl-alkenyl ethers comprising passing a terminal alkene containing two to four carbon atoms through a solution consisting essentially of a salt or co-ordination compound of palladium, a polar solvent, an alkanol having one to four carbon atoms, an alkali metal halide other than a fluoride and up to 10% by weight of water, at a temperature not exceeding 150° C. and at a partial pressure of the alkene of up to 100 atmospheres, and removing the alkyl-alkenyl ether formed in the gas stream of alkene.

This application is a continuation-in-part of co-pending U.S. application Ser. No. 402,937 filed Oct. 9, 1964 and now abandoned.

This invention relates to the production of ethers, particularly unsaturated ethers such as methyl vinyl ether.

It is already known that ethylene will react with a solution comprising palladous chloride and ethanol to give 1:1-diethoxyethane. It has been suggested that the formation of this compound takes place via ethyl vinyl ether but, hitherto, this compound has not been isolated from the reaction mixture. We have now found that ethyl vinyl ether and its homologues can be isolated as products from reactions of the type described by carrying these out under specially regulated conditions.

Thus, according to the present invention, there is provided a process for the production of alkyl-alkenyl ethers which comprises the step of contacting a terminal olefine with a substantially anhydrous solution of a palladium compound the said solution containing an alcohol, the ether being removed from the reaction zone immediately upon formation.

Olefines suitable for use in the present invention include ethylene, propylene and butene-1. When using an olefine containing 3 or more carbon atoms, isomeric ethers may be formed, for example allyl and propenyl ethers. A wide range of alcohols may be used, for example primary alcohols such as methanol and ethanol, secondary alcohols such as isopropanol and tertiary alcohols such as tertiary butanol.

The palladium compound may be either a salt or co-ordination compound of palladium. Preferred salts are the halides and carboxylates, especially lower aliphatic carboxylates containing up to six carbon atoms. In particular palladous chloride, bromide and acetate may be used. Other examples of suitable palladous carboxylates are palladous propionate, butyrate, isobutyrate and crotonate. Palladous mono- and dicarboxylates unsubstituted or substituted with non-reactive substituents, e.g. palladous chloro-acetate are contemplated for use herein. Suitable co-ordination compounds of palladium include lithium chloropalladite, sodium chloropalladite, potassium chloropalladite, lithium bromopalladite, sodium bromopalladite, potassium bromopalladite, dichlorobis(benzonitrile)palladium (II) and allyl palladous chloride. The co-ordination compounds may be added to the reaction zone as such, or may be formed in situ from two or more components added separately. Thus a co-ordination compound containing an alkali metal, palladium and a halogen other than fluorine may be formed in situ by adding a palladium salt and an alkali metal halide other than a fluoride, for example lithium chloride, sodium chloride, potassium chloride, lithium bromide, sodium bromide and potassium bromide, separately to the reaction zone.

The palladium compound may be dissolved in an excess of the terminal olefine where this is liquid under the reaction conditions. However for terminal olefines which are normally gaseous such as ethylene and propylene a solvent is employed.

The solvent for the reaction should be polar and yet inert possessing a solubilising power for the olefine, alcohol and catalyst. The most suitable solvents are carboxylic acids which are liquid under the reaction conditions, particularly lower alkanoic acids containing up to ten carbon atoms, more particularly acetic, propionic, butyric, valeric and capric acids. Ester derivatives of these carboxylic acids may also be used, the lower alkyl esters in which the alkyl group contains up to six carbon atoms, e.g. methyl, ethyl, propyl, and butyl, and also phenyl and benzyl esters being preferred. Other carboxylic acid derivatives which provide suitable solvents are amides, e.g. formamide, dimethylformamide, N-methylacetamide and dimethylacetamide; nitriles, e.g. acetonitrile, propionitrile, butyronitrile and benzonitrile, Ethers, e.g. diethyl ether, di-isopropyl ether, tetrahydrofuran, 1,4-dioxane, ethylene glycol, diethyl ether and diethylene glycol, dimethyl and dibutyl ethers may also be used as solvents. Other ethylene glycol derivatives which may be used are diesters such as ethylene glycol diacetate and the analogous internal ester of propylene glycol, propylene carbonate is also suitable. Finally, ketonic solvents such as acetone, methyl ethyl ketone and cyclohexanone and miscellaneous solvents such as dimethylsulphoxide, diphenyl sulphoxide and sulpholane may also be used in the process. The presence of water results in by-product formation but up to 10% by weight may be tolerated. Preferably the water concentration is less than 5% by weight, more preferably less than 1% by weight.

The molar concentration of the alcohol is preferably maintained at a low level for example less than two moles per litre of the alcohol, to help reduce acetal formation. Thus, when using ethanol in the production of ethyl vinyl ether, a concentration of 1% by volume of ethanol is suitable.

When using an olefine which is a gas under the reaction conditions, it is desirable to use an elevated olefine partial pressure, e.g. up to 100 atmospheres, to increase the solubility of the olefine and to ensure that substantially all of the palladium is in the form of a complex.

When using a lower olefine, that is to say one containing 4 carbon atoms or less, it is desirable to employ a reaction temperature which does not exceed 150° C. However, with higher olefines, higher operating temperatures may be used, for example temperatures up to 300° C.

The production of methyl vinyl ether or ethyl vinyl ether, using methanol or ethanol and ethylene as the starting material may be effected by passing a mixture comprising ethylene and the alcohol through a solution of palladous chloride or palladous acetate.

It is desirable for the average residence time of the ether product in the reaction zone to be short, preferably less than one minute. The ether product may be removed from the reaction zone by any suitable means, but distillation is particularly applicable, the removal of the ether being facilitated by passing a stream of the olefine, when the latter is gaseous under the reaction conditions, through the reaction mixture. If the olefine is not gaseous, removal of the ether may be assisted by passing a stream of an inert gas such as nitrogen or argon through the reaction mixture.

The alkyl-alkenyl ethers produced by the present process may be used as intermediates in the synthesis of organic compounds; for instance methyl vinyl ether may be used in the synthesis of pyridine, or in the production of polymers.

EXAMPLE 1

In 180 ml. of glacial acetic acid, a solution was made up of palladous chloride ($1.38 \times 10^{-2}$ mole) and lithium chloride ($1.40 \times 10^{-2}$ mole). This solution was treated with ethylene at atmospheric pressure and 20 ml. of a liquid consisting of 18 ml. glacial acetic acid and 2 ml. ethanol were introduced. The distribution of reaction products after various periods of time is given in the table below.

| Reaction time (minutes) | 1 | 5 | 15 |
|---|---|---|---|
| Acetaldehyde (percent) | 10 | 30 | 30 |
| Ethyl vinyl ether (percent) | 80 | 40 | 30 |
| 1:1-diethoxyethane (percent) | 10 | 30 | 40 |

EXAMPLE 2

$5 \times 10^{-4}$ moles of palladous chloride, $5 \times 10^{-4}$ moles of lithium chloride, 95 mls. dimethylacetamide and 5 mls. of methanol were stirred at 50° C. in a flask provided with a stirrer, water cooled condenser and a thermometer. Ethylene was passed through the reaction mixture at a rate of 50 litres/hour. The methyl vinyl ether formed was removed in the stream of ethylene and determined by gas-liquid chromatography.

In 22 minutes $7 \times 10^{-5}$ moles of methyl vinyl ether were produced. No acetal was detected.

EXAMPLE 3

Example 2 was repeated replacing the palladous chloride and lithium chloride by $5 \times 10^{-4}$ moles of dichloro bis(benzonitrile)-palladium (II).

In 20 minutes $4 \times 10^{-5}$ moles of methyl vinyl ether were produced. No acetal was detected.

EXAMPLE 4

$2.5 \times 10^{-2}$ moles of palladous acetate, 500 mls. of dimethyl acetamide and 500 mls. of methanol were heated in a stainless steel reactor fitted with a gas inlet and exit system, a pressure let-down valve being fitted in the gas exit line. The reactor was pressured up to 400 lbs./sq. inch with ethylene and ethylene passed through the reactor at a rate of 1000 litres/hour. The ether formed was removed in the exit gas stream and determined chromatographically.

In 20 minutes $2.2 \times 10^{-3}$ moles of methyl vinyl ether were produced together with $4.67 \times 10^{-3}$ moles of acetal.

EXAMPLE 5

$2.5 \times 10^{-3}$ moles of palladous chloride, $2.5 \times 10^{-3}$ moles of lithium chloride, 250 mls. of dimethylacetamide and 250 mls. of methanol were stirred at 25° C. in a flask provided with a stirrer, water cooled condenser and thermometer. Ethylene was passed through the reaction mixture at a rate of 50 litres/hour.

In 20 minutes $1.2 \times 10^{-3}$ moles of methyl vinyl ether were produced.

EXAMPLE 6

$2.5 \times 10^{-3}$ moles of palladous chloride, $2.5 \times 10^{-3}$ moles of lithium chloride, 250 mls. of dimethylacetamide, 250 mls. of methanol and 10 mls. of water were stirred at 25° C. in a flask provided with a stirrer, water cooled condenser and thermometer. Ethylene was passed through the reaction mixture at a rate of 50 litres/hour. The ether formed was removed in the gas stream and determined chromatographically.

In 8 minutes $7.25 \times 10^{-4}$ moles of methyl vinyl ether were produced together with $12.25 \times 10^{-4}$ moles of acetal.

EXAMPLE 7

$5 \times 10^{-3}$ moles of palladous chloride, $5 \times 10^{-3}$ moles of lithium chloride, 50 mls. of dimethyl acetamide and 50 mls. of methanol were stirred at 50° C. in a flask provided with a stirrer, water cooled condenser and thermometer. Ethylene was passed through the reaction mixture at a rate of 50 litres/hour. The ether formed was removed in the gas stream and determined chromatographically.

In 20 minutes $1.25 \times 10^{-3}$ moles of methyl vinyl ether were produced together with $0.8 \times 10^{-3}$ moles of acetal.

We claim:

1. A process for the production of alkyl-alkenyl ethers comprising passing a terminal alkene containing two to four carbon atoms through a solution consisting essentially of palladous halide, and inert organic polar solvent, an alkanol having one to four carbon atoms, an alkali metal halide other than a fluoride and up to 10% by weight of water, at a temperature not exceeding 150° C. and at a partial pressure of the alkene of up to 100 atmospheres, and removing the alkyl-alkenyl ether formed in the gas stream of alkene.

2. A process as claimed in claim 1 in which the solution contains less than 5% by weight of water.

3. A process as claimed in claim 1 in which the concentration of the alkanol is less than 2 moles per litre of solution.

4. A process as claimed in claim 1 in which the average residence time in the reaction zone of the alkyl-alkenyl ether product is less than one minute.

5. A process as claimed in claim 1 wherein the alkali metal halide is selected from the group consisting of lithium chloride and sodium chloride.

6. A process as claimed in claim 1 in which a vinyl ether is produced by contacting ethylene at a temperature not exceeding 150° C. and at a partial pressure of up to 100 atmospheres with a solution consisting essentially of:
   (a) palladous chloride,
   (b) a member selected from the group consisting of acetic acid and dimethylacetamide,
   (c) a member selected from the group consisting of methanol, ethanol, isopropanol and tertiary butanol in a concentration of less than 2 moles per litre,
   (d) less than 5% by weight of water; and
   (e) alkali metal halide other than a fluoride;
and removing the vinyl ether from the reaction zone immediately upon formation.

7. The process of claim 1 in which the polar solvent is selected from the group consisting of lower alkanoic acids which are liquid under the reaction conditions, formamide, dimethyl formamide, N-methylacetamide, dimethylacetamide, acetonitrile, propionitrile, butyronitrile, benzonitrile, dimethyl sulphoxide, diphenylsulphoxide, and sulpholane.

8. A process as claimed in claim 3 wherein the carboxylic acid is acetic acid.

(References on following page)

References Cited

UNITED STATES PATENTS

| | | | |
|---|---|---|---|
| 3,173,958 | 3/1965 | Milgrom et al. | 260—614 AA |
| 3,285,970 | 12/1966 | Schaffer | 260—614 AA UX |
| 3,479,392 | 11/1969 | Stern et al. | 260—614 AA |

FOREIGN PATENTS

| | | | |
|---|---|---|---|
| 1,086,351 | 10/1967 | Great Britain | 260—614 AA |
| 1,100,023 | 2/1968 | Great Britain | 260—614 AA |

OTHER REFERENCES

Moiseev et al., Translations From Dokiady Akad Naukssr, vol. 133, No. 2 (pp. 370–380), pp. 801–804, 1960.

HOWARD T. MARS, Primary Examiner

U.S. Cl. X.R.

260—604 AC, 615 A